United States Patent
Jin (10) Patent No.: US 9,663,361 B2
(45) Date of Patent: May 30, 2017

(54) HYDROGEN GENERATING COMPOSITION, REACTOR, DEVICE AND HYDROGEN PRODUCTION METHOD

(71) Applicant: Ke Jin, Shanghai (CN)

(72) Inventor: Ke Jin, Shanghai (CN)

(73) Assignee: Ke Jin, Shanghai (CN)

( * ) Notice: Subject to any disclaimer, the term of this patent is extended or adjusted under 35 U.S.C. 154(b) by 0 days.

(21) Appl. No.: 14/434,240

(22) PCT Filed: Sep. 16, 2013

(86) PCT No.: PCT/CN2013/083551
§ 371 (c)(1),
(2) Date: Apr. 8, 2015

(87) PCT Pub. No.: WO2014/056386
PCT Pub. Date: Apr. 17, 2014

(65) Prior Publication Data
US 2015/0274523 A1    Oct. 1, 2015

(30) Foreign Application Priority Data

Oct. 12, 2012  (CN) .......................... 2012 1 0387146

(51) Int. Cl.
*C01B 3/06* (2006.01)
*B01J 19/24* (2006.01)
*H01M 8/0606* (2016.01)

(52) U.S. Cl.
CPC ............... *C01B 3/065* (2013.01); *B01J 19/24* (2013.01); *H01M 8/0606* (2013.01);
(Continued)

(58) Field of Classification Search
USPC ....................................................... 423/657
See application file for complete search history.

(56) References Cited

U.S. PATENT DOCUMENTS

| | | | | |
|---|---|---|---|---|
| 4,806,294 A | * | 2/1989 | Lapierre ................... | C08J 9/065 264/337 |
| 2015/0376002 A1 | * | 12/2015 | Wallace .................... | C01B 3/06 423/657 |

FOREIGN PATENT DOCUMENTS

| CN | 101428756 | | 5/2009 |
|---|---|---|---|
| CN | 101428756 A | * | 5/2009 |

(Continued)

OTHER PUBLICATIONS

GmbH foam technology, 2008, p. 1-3.*
(Continued)

*Primary Examiner* — Melvin C Mayes
*Assistant Examiner* — Syed Iqbal
(74) *Attorney, Agent, or Firm* — Oliff PLC (57) ABSTRACT

The present invention discloses a hydrogen generating composition, reactor, device and hydrogen production method. The composition includes sodium borohydride and a filler. The filler is a substance having a chemical stability and a water solubility of less than 10 g per 100 g of water under an alkaline or neutral condition at a temperature of 130° C. to 140° C. The filler has a bulk volume of 0.02~16 times the bulk volume of the sodium borohydride. A mass ratio between the filler and the sodium borohydride is less than or equal to 2:1. The filler has a bulk density of less than 16 and has a mean particle size smaller than that of the sodium borohydride. The present invention has a high hydrogen production density, adequate reaction, lower cost and is environmentally friendly, practical and simple to pause and restart.

18 Claims, 1 Drawing Sheet

(52) U.S. Cl.
CPC .. *B01J 2219/00074* (2013.01); *B01J 2219/24* (2013.01); *Y02E 60/362* (2013.01)

(56) References Cited

FOREIGN PATENT DOCUMENTS

| | | |
|---|---|---|
| CN | 101841048 | 9/2010 |
| WO | 2010087698 | 8/2010 |

OTHER PUBLICATIONS

Wang Zhen-Bo, et al. Preparation and influence of performance of anodic catalysts for direct methanol fuel cell; vol. 38 No. 4; Apr. 2006; 5 pages (English Abstract).

Liu Wei-Feng, et al. Fabrication and evaluation of the Pt/c catalyst for the anode of the PEMFC; Chinese Journal of Power Sources; http://www.cqvip.com; vol. 29 No. 7, Jul. 2005; 3 pages (English Abstract).

* cited by examiner

HYDROGEN GENERATING COMPOSITION, REACTOR, DEVICE AND HYDROGEN PRODUCTION METHOD

TECHNICAL FIELD

The present invention relates, in general, to the field of hydrogen generation, and more particularly, to a sodium borohydride-containing composition, an apparatus and a method for generation of hydrogen gas.

BACKGROUND

Hydrogen is considered as a promising new energy source. Currently, as there are many technical bottlenecks in its transportation in a high density, chemical solutions are relied on to produce hydrogen in the field for meeting practical needs.

One of such solutions is to inject an aqueous solution of a borohydride, particularly sodium borohydride ($NaBH_4$), as a hydrogen source, added with a small quantity of a strong base as a reagent for preventing too rapid hydrolysis of it, into a fixed bed reactor filled with a catalyst, to cause high-speed generation of hydrogen gas from the reaction $NaBH_4+(2+n) H_2O=NaBO_2 \cdot nH_2O+4H_2$. Despite its several advantages such as relatively controllable start and stop of hydrogen generation, this method still suffers from many deficiencies, in particular, a low hydrogen production density—4.6 wt % obtained on a stoichiometric basis, with borohydride being adequately reacted at a concentration of 22%. The U.S. company, Millennium Cell Inc., which invented and promoted this method finally went bankrupt.

For this reason, subsequent improvement efforts have been made, focusing primarily on the direct hydrolysis of solid borohydride.

For instance, Chinese Patent Application No. 02121472.7 discloses a vehicle-mounted hydrogen generator which utilizes the hydrolysis of a solid. The solid reactant may be $CaH_2$ or $NaBH_4$ containing a catalyst or a mixture thereof. The catalyst may contain active substances such as Fe, Co, Ni, Cu and Mn. The $NaBH_4$ or the mixture of $NaBH_4$ and $CaH_2$ is added into a solution containing one or more of $Fe^{3+}$, $Fe^{2+}$, $Co^{2+}$, $Ni^{2+}$, $Cu^{2+}$ and $Mn^{2+}$ ions to initiate a hydrolysis reaction. As the drawbacks of this technique have been well discussed and demonstrated in subsequent patent applications in this regard, they will not be further detailed herein.

Additionally, a U.S. company, Rohm and Haas, proposed a "Method for Generation of Hydrogen Gas from Borohydride" (see Chinese Patent Application No. 200710006384.8 or U.S. Patent Application Ser. No. 60/774,258), which discloses a method for generating hydrogen by way of combining a solid composition containing borohydride and one or more bases with an aqueous solution of one or more acids. Compared to other conventional techniques that do not employ a base, this method is advantageously capable of relatively rapidly stopping the generation of hydrogen. However, as the main objective of this reference is the rapid stop of the hydrolysis reaction, it provides no means to detect whether the $NaBH_4$ has been adequately hydrolyzed, nor any means to determine a needed amount of water for adequate hydrolysis of the $NaBH_4$.

Moreover, the U.S. company, Rohm and Haas, further provided a "Method for Generation of Hydrogen Gas" (see U.S. Patent Application Ser. No. 61/201,390 or Chinese Patent Application No. 200910258540.9), which describes a method that is capable of producing hydrogen with reduced foaming and is achieved by combining, in the presence of a transition metal catalyst, water with a solid composition containing borohydride and a base. However, as its main objective is foaming reduction, the reference neither provides any means to detect whether the $NaBH_4$ has been adequately hydrolyzed, nor any means to determine a needed amount of water for adequate hydrolysis of the $NaBH_4$.

In addition, Chinese Patent Application No. 201010261788.3 discloses a method for high-speed, high-safety hydrogen generation from a borohydride-containing composition as a hydrogen source and a portable hydrogen generator. The borohydride-containing composition is a mixture in a ratio of moles of boron atoms of the borohydride to moles of boron atoms of a boron oxide of 1:4-0.5. The hydrogen generator includes an enclosed container that holds the mixture and is provided with, situated under the mixture, a gasbag and/or a mechanical agitator driven by air pressure gradients. This method addresses the shortcomings of the aforementioned hydrogen generation methods either utilizing a hydrolysis of a borohydride solution with a strong base or using a catalyst and is capable of a high hydrogen production rate, hydrogen generation stoppage in 3-10 seconds, high safety and stability under normal temperature and pressure conditions, and long-term storage of the mixture without self-discharge of hydrogen. Furthermore, in the Background section of the reference, it is pointed out that, during the hydrogen generating reaction of a mixture of pulverized $NaBH_4$ and an activating agent (which is implemented as an acid, e.g., $H_3BO_3$, in a solid form) with water, as described in U.S. Pat. No. 7,438,732B2, if the solid product resulting from the reaction is not smashed in a timely way, it will agglomerate into large lumps which can block the contact between water and the reactant and thus halt the reaction, and that although the reaction can be resumed by adding a sufficient amount of water to dissolve the lumps therein, this will suddenly create extensive contact between the water and the reactant which will cause the reaction to proceed uncontrollably at a high rate to lead to a risk of explosion.

Further, Chinese Patent Application No. 201010114398.3 discloses the use of mechanically ball-milled lithium borohydride ($LiBH_4$) and porous carbon as a hydrogen source, which is brought into contact with liquid water or water vapor introduced at a controlled flow rate or a saturated pressure, in order for $LiBH_4$ to be hydrolyzed to produce hydrogen gas in a desired amount or at a desired speed. By controlling a weight ratio of lithium borohydride to porous carbon in the range of 93~90%:7~10%, compared to those using $NaBH_4$, this solution is capable of a sustained stable rate and a higher efficiency in a more controllable way without involving the use of any catalyst. Further, the reference points out, in its Background section, that due to an enveloping effect of the solid product, a $NaBH_4$ reaction system cannot achieve full release of hydrogen molecules if there is not a suitable catalyst to accelerate the reaction, and in the Summary of Invention section that, the invention is capable of sustained stable hydrogen production at an efficiency higher than that of a technique utilizing the hydrolysis of $NaBH_4$.

Furthermore, Chinese Patent Application No. 201010258192.8 discloses a hydrogen generator, including: a tank for holding a liquid reactant; a porous structure impregnated with a solid reactant; and a guidance means connected to the tank for guiding the liquid reactant into the porous structure to react with the solid reactant to produce hydrogen gas. The porous structure may be prepared by introducing a solution of the solid reactant in the intact form of the porous structure and causing the solid reactant to precipitate in pores of the structure by means of heating. Optionally, prior to the impregnation of the solid reactant, a solution of a catalyst can be first introduced in the intact porous structure and then heated to cause the catalyst to precipitate in pores of the structure. The solid reactant may include sodium borohydride, magnesium hydride, calcium hydride or aluminum. The catalyst solution may include an aqueous solution of cobalt chloride, iron chloride, cobalt sulfate or nickel chloride. The catalyst may include cobalt chloride, iron dichloride, cobalt sulfate or nickel chloride. The liquid reactant may be water, an aqueous solution of malic acid, an aqueous solution of citric acid, an aqueous solution of sulfuric acid, an aqueous solution of sodium bicarbonate, an aqueous solution of calcium carbonate, an aqueous solution of cobalt dichloride, an aqueous solution of cobalt chloride, an aqueous solution of iron dichloride, an aqueous solution of cobalt sulfate, or an aqueous solution of nickel chloride.

SUMMARY OF THE INVENTION

The present invention addresses the issues in the conventional borohydride-based hydrogen generation techniques, such as a low hydrogen production density, inadequate hydrolysis of borohydride, use of strong bases or toxic catalysts that are detrimental to the environment, and high cost, by presenting a sodium borohydride-containing composition, a reactor and a method, capable of achieving a high hydrogen production density in a borohydride-adequately-hydrolyzable, environmentally-friendly, low-cost, cost-efficient, easily-stoppable-and-restartable way. Thanks to the invention, water consumption can be reduced to a very low level. In particular, when it is used in combination with a fuel cell equipped with means for recycling output water, a further increase in the hydrogen production density can be achieved, and the need for water supplementation from an external source is eliminated to significantly improve the maintainability and environmental independence of the fuel cell.

After extensive research, contemplation, and analysis, the inventor has found that:

The prior art reference U.S. 60/774,258 requires the use of, on one hand, at least one acid with a certain concentration, which necessitates a specially prepared solution for the acid and thus adds complexity as compared to the techniques directly using water rather than the acid, and on the other hand, at least one strong base in a large amount in some embodiments, which is adverse to the environment.

The preferred catalyst cobalt chloride used in prior art reference U.S. 61/201,390 is environmentally harmful and expensive. Further, as some of its preferred embodiments also require the use of acid(s) and strong base(s), it has the same disadvantages as described above, i.e., higher complexity and environmentally unfriendliness.

The airbag and the mechanical agitator increase the weight, size and complexity of the generator described in the prior art reference CN201010261788.3. Additionally, this technique also suffers from a limited hydrogen production density. When calculated in the context that $B_2O_3$ is selected to be used with $NaBH_4$ and the only byproduct of the reaction is $Na_2B_4O_7$, the most optimal mass ratio for $NaBH_4$ and $B_2O_3$ will be 38:35, indicating a considerable contribution of $B_2O_3$ to the total reactant mass, which serves as the denominator to the expression for calculating the hydrogen production density. Moreover, as each $Na_2B_4O_7$ molecule can combine a maximum number of ten water molecules, it can be understood that this technique also suffers from high water consumption. Further, in the section of Embodiment 1 in the specification of the reference, it is described that a hydrogen production of 1.2 L from 1.0 g of $NaBH_4$ could be considered as the result of an adequate reaction of $NaBH_4$. However, according to a calculation based on the formula $NaBH_4+(2+n)$ $H_2O=NaBO_2 \cdot nH_2O+4H_2$, if the reaction had progressed adequately, the produced hydrogen gas would have had a volume of 2.35 L. That is, the reaction is far from being able to be considered as adequate. The same conclusion can be reached even when the calculation is conducted based on the formula provided in the section itself. Furthermore, the section also revealed that even after being dehydrated at a temperature of 100° C., the product $Na_2B_4O_7$ was still in the pentahydrate form (i.e., $Na_2B_4O_7 \cdot 5H_2O$). Given this fact, even it is ideally assumed that $NaBH_4$ can thoroughly react, with $B_2O_3$ added in an amount containing the same moles of boron atoms as that of the $NaBH_4$, and results in $Na_2B_4O_7 \cdot 5H_2O$, the hydrogen production density of this technique will be only $16/(76+70+162)=5.2\%$.

Use of the extremely expensive $LiBH_4$ and, in some embodiments, expensive single-walled carbon nanotubes renders the technique described in the prior art reference CN201010114398.3 less practical. The reference does not include the relatively low-price $NaBH_4$ in its scope. Through further researches, the inventor of the present invention believes that the primary reason for this is the high water solubility of $NaBH_4$ and the high proneness of $NaBO_2$, which is a product of the hydrolysis of $NaBH_4$, to being crystallized from water to form agglomerates. As the reference involves a process of ball-milling both the $LiBH_4$ and the porous carbon into fine particles which are present in close neighborhood, if $NaBH_4$ is used in lieu of the $LiBH_4$, this process will facilitate the agglomeration of $NaBH_4$ and $NaBO_2$, which can only be mitigated by preparing the $NaBH_4$ in a very large bulk volume. In addition, the measurement of mean particle sizes of the milled $LiBH_4$ and porous carbon was not conducted in this reference. Therefore, we could not preclude the possibility that the mean particle size of the milled $LiBH_4$ is smaller than that of the milled porous carbon. If this happens to $NaBH_4$, there is a chance for the formation of microcosmic structures each with small $NaBH_4$ particles surrounding a large porous carbon particle, which is prone to leading to the agglomeration of $NaBH_4$ and $NaBO_2$. Further, while in the section of Embodiment 4 in the reference, a scenario is described in which 1.44 L of hydrogen gas was produced from 0.93 g of $LiBH_4$, and this production was believed to be equal to the theoretical value. However, according to the result of a calculation performed by the inventor of this invention based on the formula $LiBH_4+(2+n)$ $H_2O=LiBO_2 \cdot nH_2O+4H_2$, the theoretical production is 3.78 L rather than the 1.44 L. This renders the claimed adequacy of the reaction rather doubtful. Furthermore, the reaction of this technique is controlled at a low temperature, at which $NaBH_4$ is prone to absorbing water, or even moisture, to be fluidized to flow in all directions, and what is worse is that in a paused period of the reaction, the $NaBH_4$ will precipitate from the fluidized state and agglomerate and thus become useless.

Extensive varieties of applicable solid reactants (i.e., sodium borohydride, magnesium hydride, calcium hydride or aluminum), catalysts, and liquid reactants are enumerated in the prior art reference CN201010258192.8, which makes the reference lack of pertinence and specificity. Although it claims an ability to improve the efficiency of hydrogen production from the solid and liquid reactants, in the provided exemplary embodiments which are described in generalities, no experimental data about adequacies and rates of reactions, densities of reactants and porous structures, mass of residual products, and consumed amounts of the liquid reactants was provided for followers' reference as a basis for further improvements.

According to the specification of the reference, the solid reactant 60a is present in the porous structure 120 (e.g., in pores of the structure 120 with a size of 5~200 μm) in the form of powder, particles, crystals or the like. However, according to the aforementioned finding of the inventor of the present invention obtained in the course of researches, in the case of sodium borohydride, for a given bulk volume, a too small particle size will cause its particles to be present in very close neighborhood, which is a possible cause for the occurrence of particle agglomeration during the reaction, and the only solution for this problem is to increase the bulk volume.

Another disadvantage of this technique is the complicated and costly process for impregnating the solid reactant in the pre-prepared porous structure. In addition, in its embodiment in which sodium borohydride is selected from the four recommended solid reactants (i.e., sodium borohydride, magnesium hydride, calcium hydride and aluminum) to be combined with a corresponding liquid reactant, which is recommended to be liquid ammonia or water, the use of liquid ammonia, however, will necessitate, in the thermal precipitation of the solid reactant, the involvement of a process for recycling or discharging the liquid ammonia, which will either add complexity or be environmentally detrimental, and the use of water is believed, by the inventor of the present invention based on certain research findings, to be possible to cause hydrolysis and hence partial loss of the hydrogen source during the thermal precipitation of the solid reactant. In another embodiment of the reference, a solid catalyst is first impregnated in the porous structure prior to further impregnating the solid reactant therein, and in order to prevent the pre-existing catalyst from causing the solid reactant to react in an undesirable way, the reactant is first dissolved in a low-concentration solution of sodium hydroxide before it is intruded into the porous structure. However, according to further research findings of the inventor of the present invention, sodium hydroxide present in a low concentration in the ternary system consisting of sodium borohydride, the catalyst and water will not function as desired to prevent the occurrence of a fierce hydrolysis reaction, and instead, the porous structure impregnated with the catalyst indeed has the same function as the fixed bed reactor provided by the Millennium Cell Inc. Therefore, whether this technique could be experimentally validated is rather doubtful.

Furthermore, since this prior art technique employs water-base liquid reactants, which, when combined with sodium borohydride, will result in the crystallization-prone $NaBO_2$ (each molecule is usually crystallized with a maximum of 4 water molecules), its water consumption will be relatively high to limit the hydrogen production density to a low level. Moreover, at 100° C. or a lower temperature, it is highly possible for $NaBH_4$ and its product to be fluidized by moisture absorption and subsequently precipitate as agglomerates to clog the pores to make the porous structure useless. Further, all the aqueous solutions out of the recommended liquid reactants need to be prepared in advance, which adds complexity and makes the process less environmentally adaptive, and what is worse is that some of the solutions are environmentally detrimental.

Compared to the prior art reference CN201010258192.8, the present invention is advantageous in significant pertinence and specificity—experiments of the exemplary Embodiments in accordance with the present invention described below are all specifically quantified for reference in terms of exemplified compositions, method parameters and results. According to the experimental results, the composition and method of the present invention provide the advantages of a higher reaction adequacy, low water consumption, higher hydrogen production rate, higher environmental friendliness, low process cost, etc., as compared with the prior art techniques.

Accordingly, to address the aforementioned technical issues, the present invention provides the following technical solutions:

In one aspect, the present invention provides a sodium borohydride-containing composition for generation of hydrogen. The composition includes sodium borohydride and a filler. The filler is a substance having a chemical stability under an alkaline or neutral condition at a temperature in the range of 130° C. to 140° C. and a water solubility of less than 10 g per 100 g of water, where the chemical stability is an absence of the decomposition of the substance itself and of the occurrence of any chemical reaction of the substance with the sodium borohydride or water. The filler may have a bulk volume that is 0.02 to 16 times a bulk volume of the sodium borohydride, and may be present in a mass ratio to the sodium borohydride of equal to or less than 2:1. Further, the filler may have a bulk density of less than 16 and a mean particle size that is smaller than a mean particle size of the sodium borohydride.

The alkaline condition is an alkalinity resulting from moisture-caused hydrolysis of the $NaBH_4$ or of its reaction product $NaBO_2$.

The chemical reaction does not include simple hydration. For example, in certain embodiments of the invention, the filler is implemented as $Mg(OH)_2$, which can be easily substituted by those of ordinary skill in the art for MgO, which is convertible to $Mg(OH)_2$, in part or as a whole, by simple hydration with water without significant changes in its physical and chemical properties and thus can achieve essentially the same result as the invention. It is therefore intended that such simple hydration is also within the scope of the invention.

For the same reason, the decomposition does not include simple dehydration. For instances, some hydroxides transform into corresponding oxides at certain temperatures by simple dehydration without significant changes in its physical and chemical properties and thus can achieve essentially the same result as the invention. It is therefore intended that decomposition of the filler due to such simple dehydration is also within the scope of the invention.

The ratio of the bulk volume of the filler to the bulk volume of the sodium borohydride of 0.02~16 can be a ratio either before or after the two substances are mixed together.

Herein, the filler functions as a physical support structure for isolating sodium borohydride particles to prevent their agglomeration, rather than a chemical reactant or a catalyst. Thus, it will be easily understood that the filler can be selected from an extensive variety of substances and each of its mass, volume, or bulk density ratios to the sodium borohydride can be selected from a wide range.

Preferably, the filler is present in a mass ratio to the sodium borohydride of equal to or less than 1:1, with equal to or less than 0.5:1 being more preferred, and with equal to or less than 0.1:1 being most preferred. A small mass ratio of the two substances is desirable for reducing the mass of the composition to result in an increased hydrogen production density. In contrast, while a larger mass ratio will not have any impact on the reaction adequacy and other technical criteria, it will increase the mass of the composition and hence leads to a lower hydrogen production density to reduce the practicality of the composition. For example, when the mass ratio is increased to 3:1, the composition will have a hydrogen production density only ¼ of that of $NaBH_4$, causing a significant reduction in practicality.

Preferably, the filler is a substance having a bulk density of less than 2, with a substance having a bulk density of less than 0.5 (for example, $Mg(OH)_2$ which has a bulk density of 0.4) being more preferred, with a substance having a bulk density of less than 0.1 being even more preferred, and with foamed plastic pellets being most preferred (all known foamed plastic pellets have a bulk density of far less than 0.1). An extremely low bulk density of the filler is desirable for increasing the hydrogen production density of the composition. In contrast, while a larger bulk density will not have any impact on the reaction adequacy and other technical criteria, it will increase the mass of the composition and hence leads to a lower hydrogen production density to reduce the practicality of the composition. For example, if a substance with the same bulk volume but a bulk density of 16 is used in lieu of the filler in Embodiment 7 described below, the mass of the substance will be greater than 2 g, exceeding the mass of the used sodium borohydride, and accordingly, the hydrogen production density of the composition will be reduced by half and thus become less practical. Bulk density is defined as the density of a solid when packed or stacked in bulk and its unit is $g/cm^3$. Foamed plastic pellets are generally produced from plastic pellets encapsulating thermo-expandable liquid or gas which expand tens of times its original size at a certain temperature into an extremely low bulk density. A conventional application of such plastic pellets is in the production of braille materials, in which the pellets are mixed with ink in an "unfoamed" form, and the mixture is then printed in patterns representing desired characters. When heated, the pellets expand to make the patterns embossed such that the visually impaired can read them by finger touch.

Preferably, the bulk volume of the filler is 0.2 to 8 times the bulk volume of the sodium borohydride, with 2 to 4 times being more preferred. A relatively large inter-particle distance is advantageous in preventing the agglomeration of sodium borohydride particles, and this distance can be maintained in an appropriate range when the bulk volume ratio of the filler to the sodium borohydride is set above 0.02. However, on the other hand, when the bulk volume ratio exceeds 16, even though it has no impact on the reaction adequacy and other technical criteria, the volume of the composition will become too large to meet the requirement of cost-effective storage and transportation, the mass and cost of the filler will increase to an unsuitable level, and the reactor will be required to have a larger housing which will lead to increase in weight and cost. For example, when the bulk volume ratio of the two substances is set to 20, the volume of the composition in each of the Embodiments described below will increase from about 4 cc to about 80 cc, which will lead to a significant reduction in practicality.

Preferably, the mean particle size of the filler is smaller than 0.5 times the mean particle size of the sodium borohydride, in order to facilitate the formation of microcosmic structures in which sodium borohydride particles are surrounded by particles of the filler and thus will not agglomerate together.

Preferably, the mean particle size of the sodium borohydride is larger than or equal to 0.1 mm and smaller than or equal to 2 mm, with larger than or equal to 0.2 mm and smaller than or equal to 2 mm being more preferred, and with larger than or equal to 0.2 mm and smaller than or equal to 1 mm being most preferred. When the mean particle size of the sodium borohydride is too large (larger than 2 mm), surface particles will be spaced by a larger distance from underlying particles, which is unfavorable to mass transfer and exchange and will lead to inadequate reaction. Moreover, when the mean particle size of the sodium borohydride is too small (smaller than 0.1 mm), with same bulk volume of the composition, the sodium borohydride particles will be in a very close neighborhood and hence prone to agglomeration.

The filler preferably has a water solubility of 1 g/100 g, and more preferably 0.1 g/100 g, under said condition. In general terms, the lower the water solubility, the better the filler will be kept in the solid state to function to separate sodium borohydride particles to prevent their fluidization and agglomeration. In a broader sense, $NaBO_2 \cdot nH_2O$, generated during the reaction, can also be envisioned as a filler, which is, however, an "unqualified" filler incapable of preventing the fluidization and agglomeration of sodium borohydride particles due to a relatively high solubility. Accordingly, the sodium borohydride particles not added with the filler, employed in the Comparative Examples described below, can be envisioned as being inherently added with this "unqualified" filler, $NaBO_2 \cdot nH_2O$.

The composition may be in a form of a combination of the sodium borohydride and the filler before they are mixed together, or in a form of a mixture of the sodium borohydride and the filler. Further, the composition may also include water in a small quantity, or a product resulting from a reaction between water and the sodium borohydride, without departing from the broader scope of the invention. For instance, in certain conditions, part of the sodium borohydride may absorb a small amount of moisture and react therewith, and the composition will thereby include the remainder of the sodium borohydride, the filler and a product from the reaction.

In another aspect, the present invention provides a method for generation of hydrogen, including the step of subjecting the above-described sodium borohydride-containing composition to a temperature in the range of 110~160° C. and bringing it in contact with water vapor. The method is capable of a molar ratio of the consumed water to produced hydrogen gas of less than 0.9:1.

Preferably, in the method for generation of hydrogen, the temperature to which the composition is subjected is in the range of 120~150° C. A too high temperature can lead to over-dryness of the particles, which is unfavorable for obtaining a high reaction rate and a high reaction adequacy, whilst a too low temperature will lead to over-wetness of the particles, which may lead to their fluidization and agglomeration.

Also preferably, in the method for generation of hydrogen, the temperature to which the composition is subjected is in the range of 110~160° C. and gradually declines. Subjecting the composition to a high temperature in an initial phase and a low temperature in a later phase, of the reaction, can result in the following advantages: prevention of the fluidization and agglomeration of sodium borohydride particles for the initial phase; reduction of the hydrogen production in a pause period of the initial phase and hence shortening of the response time of the reaction system; and improvement of the reaction speed and adequacy for the later phase. In the later phase of the reaction, as surface of the composition is predominated by the resultant $NaBO_2$, which is less prone to fluidization than $NaBH_4$, the low temperature is relatively acceptable. On the contrary, as can be well proved by the results of the experiments conducted in the Embodiments 5 and 6 described below, the low temperature is not suitable for the initial phase of the reaction.

Water consumed in the method for generation of hydrogen includes the part absorbed by the resultant $NaBO_2$ through crystallization but does not include the part flowing across the composition and carried away by the flow of the produced hydrogen gas, because this part can be recycled into the system by means of cooling and condensation. On basis of the results of the experiments conducted in the Embodiments described below that the residual product of the reaction has a net mass of approximately 3.30 g, the actual stoichiometry of the reaction is approximately $NaBH_4 + 2H_2O = NaBO_2 + 4H_2$, indicating a molar ratio of the consumed water to produced hydrogen gas of about 0.5:1.

The present invention is particularly useful in the hydrogen supply for fuel cells. As well known, in an ideal case, a fuel cell equipped with means for recycling generated water should have a molar ratio of the recycled water to consumed hydrogen gas of 1:1. However, in practical use, the molar ratio is generally less than 1:1, since vaporized water will be carried away by air flow at the cathode, and because of inevitable leakage of hydrogen gas due to a relatively large sealing surface of the anode and intended discharge of a small amount of the hydrogen gas supplied to the anode for preventing the concentration of impurities contained therein. Therefore, only when the incorporated hydrogen generator is capable of a molar ratio of consumed water to produced hydrogen gas of less than 1:1, can the need of the water recycling means for water supplementation from an external source be eliminated to improve the hydrogen production density, the maintainability and environmental independence of the fuel cell. However, this remains a continuing challenge for most conventional hydrogen production techniques that utilize the hydrolysis of metal hydrides, such as for example, $LiH + H_2O = LiOH + H_2$. Further, in spite of a doubtful reaction adequacy, flow rate ratios of input water to output hydrogen gas described in some other embodiments in the prior art reference CN201010114398.3 seem to meet the above requirement. However, as such results are achieved by the extremely expensive $LiBH_4$ and it is clearly pointed out in the reference that the same results could not be reproduced by $NaBH_4$, this technique is far from being an ultimate solution.

In contrast, if calculated on the basis of the highest reaction adequacy achieved by experiments conducted in the Embodiments of the present invention described below, which is 95%, for applications in which water is recyclable from a fuel cell or other hydrogen consuming equipment, a hydrogen product rate as high as 8/38*0.95=20% can be obtained. Moreover, even for applications in which water is not recyclable, the hydrogen product rate will be still up to 8/(38+36)*0.95=10.3%.

It is just the method of the present invention which ensures best performance of the composition of the invention to address the issues in conventional hydrogen generation techniques and achieve the above-described benefits.

In a previous attempt of the inventor to expand the scope of the present invention to further cover $KBH_4$, the results of associated experiments showed that at a temperature higher than 110° C., the hydrolysis of $KBH_4$ progressed at a rate that was too low to be suitable for practical applications, and that when the temperature was lowered to be below 110° C., the reaction could not progress as desired in a continuous and stable way due to $KBH_4$ particles' proneness to fluidization and collapse. Therefore, it can be said that the findings of the inventor entail a "customized window of opportunity" for $NaBH_4$.

In a further aspect, the present invention provides a reactor for generation of hydrogen, which is filled with the above-described sodium borohydride-containing composition and provided with a fluid inlet and a fluid outlet.

In still a further aspect, the present invention provides an apparatus for generation of hydrogen including the above-described reactor for generation of hydrogen, a liquid container and a heater. The liquid container and the reactor are directly or indirectly connected together in a fixed or detachable manner. The liquid container may contain water and may be tubular. In addition, the heater may be preferably arranged in vicinity of the reactor or fitted in the reactor.

Since the hydrolysis of sodium borohydride is an exothermic reaction, in a well-insulated system, the heater may be used merely for heating the system to trigger the hydrolysis, and be deactivated for saving energy thereafter.

This apparatus is specially designed to be used in combination with the method of the invention. During its operation, water in the liquid container is vaporized and travels into the reactor, where it reacts with the composition of the invention to result in hydrogen gas.

The features described above can be used either individually, or combined according to any technically possible combination(s), in order to create preferred embodiments of the invention.

All of the chemical components used in the present invention are commercially available.

The present invention has the following beneficial effects:

The method of the present invention achieves a high hydrogen production density in a borohydride-adequately-hydrolyzable, environmentally-friendly, low-cost, cost-efficient, easily-stoppable-and-restartable way. The present invention further allows a very low level of water consumption, which, in particular in its use in combination with a fuel cell equipped with means for recycling generated water, can result in a further increase in the hydrogen production density, and eliminate the need for water supplementation from an external source to significantly improve the maintainability and environmental independence of the fuel cell.

DETAILED DESCRIPTION

The invention is explained in greater detail below on the basis of several embodiments and should not be construed as limited thereto. It is intended that any process, which conditions are not specified, involved in the embodiments should be construed as being performed in the same conditions as it is commonly performed, or in the conditions described in descriptive literature of associated products used therein.

Materials mentioned in the present invention are all commercially available:

| Material | Specifications | Provider |
|---|---|---|
| $NaBH_4$ | Particle size: 0.2~1.0 mm | Available in the market |
| $NaBH_4$ | Particle size: 0.1~0.2 mm | Selected from a commercially available product having a broader particle size range, by sieving in a dry environment |
| $NaBH_4$ | Particle size: 1.0~1.5 mm | Selected from a commercially available product having a broader particle size range, by sieving in a dry environment |
| $Mg(OH)_2$ | White light powder, with a particle size of 100~200 mesh and a bulk density of about 0.4 | Shanghai Tongya chemical Technology Development Co., Ltd. |
| Foamed plastic pellets | Model: H850D; Material of shells: Acrylonitrile/Methacrylonitrile/Methylmethacrylate co-polymer; Encapsulated foaming agent: mixed $C_5H_{12}$ and $C_8H_{18}$; Minimum foaming temperature: about 125° C.; Maximum foaming temperature: about 180° C.; Mean particle size before foaming: about 30 μm; Mean particle size after foaming: about 120 μm. Embodiments of this invention uses products foamed at 175° C. for 5 minutes with a bulk density of about 0.002. | Manufactured by the Japanese Dainichiseika Color & Chemicals Mfg. Co., Ltd. and available from Shanghai Jiaowei Chemical Material Co., Ltd. |
| Disposable medical syringe | 10 ml, with a plastic barrel | Shengguang Medical Instrument Co., Ltd. |

The embodiments share the following common features:

The liquid container 1 is implemented as a beaker, which contains water; the liquid pump 2 is implemented as a peristaltic pump; the reactor 3 is implemented as a disposable medical syringe filled with the composition. The reactor 3 is immersed in glycerol contained in a glass cup. A heater 4 is disposed in a lower part of the glass cup and in proximity to the reactor; a temperature sensor 5 is further included, wherein both the heater 4 and the temperature sensor 5 are connected to an external temperature controller and an external power supply. See FIG. 1.

Figure 1:
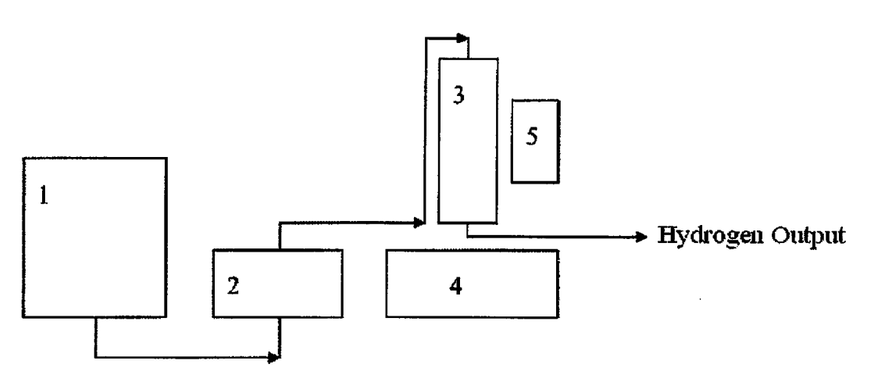
FIG. 1 illustrates an apparatus for generation of hydrogen according to embodiments of the present invention, where 1 indicates a liquid container, 2 a liquid pump, 3 a reactor, 4 a heater, and 5 a temperature sensor.

The barrel of the syringe serves as a housing of the reactor 3. The needle of the syringe is discarded and the open end of the barrel where the needle is originally fitted serves as a fluid inlet of the reactor 3. The fluid inlet is connected to an outlet of the peristaltic pump by a silicone hose with an inner diameter of 0.8 mm. The plunger of the syringe is pulled off and the rubber piston is detached from the plunger. The rubber piston is used to seal the other open end of the syringe through which the plunger is originally inserted in the syringe. A small opening is created at the center of the rubber piston as an outlet for hydrogen to exit the barrel. A length of at least 150 mm of the silicone hose is immersed in the glycerol such that water is sufficiently vaporizable before entering the reactor 3. The reactor is oriented vertically with the fluid inlet pointing upward.

The composition (or the $NaBH_4$ in each of the following Comparative Examples) is filled in the reactor to a position as near as permissible to the fluid inlet, and thereafter another, same rubber piston also bored with a small opening at the center is fitted, together with a piece of ordinary filter paper, into the barrel in an upward direction to prevent the composition (or the $NaBH_4$) from falling out of the barrel.

The production of hydrogen is estimated from the amount of expelled water.

Since mass transfer occurring on the surface of $NaBH_4$ particles is the rate-determining step of the reaction, most water vapor introduced in the reactor escapes with the produced hydrogen during the reaction, which causes the non-stoichiometry between a hydrogen production rate and a water flow rate supplied by the peristaltic pump, however, in practical applications, those of ordinary skill in this art can design a means, for example, a heat exchanger, to easily recycle the escaped water vapor as well as the heat loss due thereto for reuse.

Hydrogen generation during the temperature increasing phase is considered to be caused by an insufficiently dry state of the composition.

Unless specified otherwise, the $NaBH_4$ with a particle size of 0.2~1.0 mm is used.

Embodiment 1

A composition with a bulk volume of 5.5 cc was prepared by mixing together 1.9 g (about 0.05 Mol) of $NaBH_4$ with a bulk volume of about 4 cc and 0.95 g of $Mg(OH)_2$ with a bulk volume of about 2.4 cc, and was filled in the reactor and compacted to a volume of 5 cc using the rubber piston.

The temperature of the glycerol was controlled in the range of 130±5° C., and the flow rate of the peristaltic pump was set to 0.01 g/min.

In a temperature increasing phase before the peristaltic pump was activated, a volume of 195 cc of hydrogen was generated. After activating the pump, hydrogen was produced at an initial rate of about 350 cc/hour, and the rate started to slowly decrease 5 hours later. After the reaction had run for 7 hours, the pump was shut down for 8 hours, and during this period, 135 cc of hydrogen was further generated. Afterward, the reaction was restarted and further ran for 6 hours so that the reaction lasted for a total duration of 13 hours. The experiment was stopped when the hydrogen production rate dropped to about 150 cc/hour.

The reaction produced a total of 4050 cc of hydrogen at an adequacy of 90.4% relative to a theoretical production of 4480 cc.

The residual product of the reaction had a gross mass of 4.40 g and a net mass of 3.45 g obtained by subtracting the mass of the $Mg(OH)_2$ therefrom.

Embodiment 2

A similar experiment as conducted in Embodiment 1 was conducted except that 1.3 g of $Mg(OH)_2$ with a bulk volume of about 3.2 cc was used and a composition with a bulk volume of 6 cc was prepared, and that the composition was not compacted after it was filled in the reactor.

The reaction produced a total of 4090 cc of hydrogen at an adequacy of 91.3% relative to a theoretical production of 4480 cc.

The residual product of the reaction had a gross mass of 4.55 g and a net mass of 3.25 g obtained by subtracting the mass of the $Mg(OH)_2$ therefrom.

Embodiment 3

A composition with a bulk volume of about 11 cc was prepared by mixing together 1.9 g (about 0.05 Mol) of NaBH$_4$ with a bulk volume of about 4 cc and foamed plastic pellets with a bulk volume of about 10 cc (the weight of the pellets was too small to be measured), and was filled in the reactor and compacted to a volume of 8 cc using the rubber piston.

The temperature of the glycerol was controlled in the range of 130±5° C., and the flow rate of the peristaltic pump was set to 0.03 g/min.

In a temperature increasing phase before the peristaltic pump was activated, a volume of 190 cc of hydrogen was generated. After activating the pump, hydrogen was produced at an initial rate of about 900 cc/hour, and the rate decreased slowly with the proceeding of the reaction. After the reaction had run for 3 hours, the pump was shut down for 8 hours, and during this period, 290 cc of hydrogen was further generated. Afterward, the reaction was restarted and further ran for 3 hours so that the reaction lasted for a total duration of 6 hours. The experiment was stopped when the hydrogen production rate dropped to about 270 cc/hour.

The reaction produced a total of 4270 cc of hydrogen at an adequacy of 95.3% relative to a theoretical production of 4480 cc.

The residual product of the reaction had a gross mass of 3.35 g, which is also its net mass due to the negligible weight of the foamed plastic pellets.

Embodiment 4

A similar experiment as conducted in Embodiment 3 was conducted except that the temperature of the glycerol was controlled in the range of 140±5° C.

In a temperature increasing phase before the peristaltic pump was activated, a volume of 190 cc of hydrogen was generated. After activating the pump, hydrogen was produced at an initial rate of about 500 cc/hour, and the rate decreased slowly with the proceeding of the reaction. After the reaction had run for 5 hours, the pump was shut down for 8 hours, and during this period, 20 cc of hydrogen was further generated. Afterward, the reaction was restarted and further ran for 7.5 hours so that the reaction lasted for a total duration of 12.5 hours. The experiment was stopped, when the hydrogen production rate dropped to about 150 cc/hour.

The reaction produced a total of 4240 cc of hydrogen at an adequacy of 94.6% relative to a theoretical production of 4480 cc.

The residual product of the reaction had a gross mass (also its net mass) of 3.3 g.

Embodiment 5

A similar experiment as conducted in Embodiment 3 was conducted except that the temperature of the glycerol was controlled in the range of 150±5° C. in initial and medium phases, and 120±5° C. in a later phase, of the reaction.

In a temperature increasing phase before the peristaltic pump was activated, a volume of 330 cc of hydrogen was generated.

After the pump was activated, hydrogen was produced at an initial rate of about 200 cc/hour, and the rate decreased slowly with the proceeding of the reaction to 120 cc/hour after 16 hours. The pump was then shut down for 8 hours, during which 10 cc of hydrogen was further generated, and the reaction was thereafter restarted and further ran for 18 hours, after which the hydrogen production rate dropped to 50 cc/hour. This stage of reaction could be called the initial and medium phases.

The temperature of the glycerol was adjusted to 120±5° C., at which the reaction further ran for 1 hour to generate 150 cc of hydrogen and the experiment was stopped thereafter. This stage of reaction could be called the later phase.

The reaction produced a total of 4220 cc of hydrogen at an adequacy of 94.2% relative to a theoretical production of 4480 cc.

The residual product of the reaction had a gross mass (also its net mass) of 3.55 g, which was probably caused by a proneness of the product to moisture absorption at a temperature around 120° C.

On basis of this result, a reasonable prediction can be made that a relatively constant hydrogen production rate can be obtained by employing a control system equipped with an adaptive algorithm to gradually reduce the reaction temperature throughout the whole course of the reaction.

Embodiment 6

A similar experiment as conducted in Embodiment 3 was conducted except that the temperature of the glycerol was controlled in the range of 120±5° C.

The composition was fluidized and flowed out of the reactor in liquid drops 1~2 hours after the reaction was started, and the experiment was stopped.

In combination with the result of Embodiment 5, it can be found that a lower temperature is desirable for a later period of the reaction but not for an initial period.

Embodiment 7

A composition with a bulk volume of 4 cc was prepared by mixing together 1.9 g (about 0.05 Mol) of NaBH$_4$ with a bulk volume of about 4 cc and 0.05 g of Mg(OH)$_2$ with a bulk volume of about 0.125 cc, and was filled in the reactor.

The temperature of the glycerol was controlled in the range of 130±5° C., and the flow rate of the peristaltic pump was set to 0.01 g/min.

In a temperature increasing phase before the peristaltic pump was activated, a volume of 160 cc of hydrogen was generated. After activating the pump, the rate of hydrogen production gradually increased to about 400 cc/hour and then slowly decreased. After the reaction had run for 6 hours, the pump was shut down for 8 hours, and during this period, 110 cc of hydrogen was further generated. Afterward, the reaction was restarted and stopped 7 hours later (i.e., the total reaction period was 13 hours), when the hydrogen production rate dropped to about 150 cc/hour.

The reaction produced a total of 3760 cc of hydrogen at an adequacy of 83.9% relative to a theoretical production of 4480 cc.

The residual product of the reaction had a gross mass of 3.05 g and a net mass of 3.0 g obtained by subtracting the mass of the Mg(OH)$_2$ therefrom.

Embodiment 8

A composition with a bulk volume of 4 cc was prepared by mixing together 1.9 g (about 0.05 Mol) of NaBH$_4$ with a bulk volume of about 4 cc and 0.4 g of Mg(OH)$_2$ with a bulk volume of about 1 cc, and was filled in the reactor.

The temperature of the glycerol was controlled in the range of 140±5° C., and the flow rate of the peristaltic pump was set to 0.03 g/min.

In a temperature increasing phase before the peristaltic pump was activated, a volume of 160 cc of hydrogen was generated. After activating the pump, hydrogen was produced at an initial rate of about 400 cc/hour, and the rate decreased slowly with the proceeding of the reaction. After the reaction had run for 4 hours, the pump was shut down for 8 hours, and during this period, 20 cc of hydrogen was further generated. Afterward, the reaction was restarted and stopped 8 hours later (i.e., the total reaction period was 12 hours), when the hydrogen production rate dropped to about 150 cc/hour.

The reaction produced a total of 3910 cc of hydrogen at an adequacy of 87.3% relative to a theoretical production of 4480 cc.

The residual product of the reaction had a gross mass of 3.6 g and a net mass of 3.2 g obtained by subtracting the mass of the $Mg(OH)_2$ therefrom.

Embodiment 9

A similar experiment as conducted in Embodiment 4 was conducted except that the $NaBH_4$ with a particle size of 0.1~0.2 mm was used.

In a temperature increasing phase before the peristaltic pump was activated, a volume of 220 cc of hydrogen was generated. After activating the pump, hydrogen was produced at an initial rate of about 500 cc/hour, and the rate decreased slowly with the proceeding of the reaction. After the reaction had run for 5 hours, the pump was shut down for 8 hours, and during this period, 20 cc of hydrogen was further generated. Afterward, the reaction was restarted and stopped 6.5 hours later (i.e., the total reaction period was 11.5 hours), when the hydrogen production rate dropped to about 150 cc/hour.

The reaction produced a total of 4040 cc of hydrogen at an adequacy of 90.2% relative to a theoretical production of 4480 cc.

The residual product of the reaction had a gross mass (also its net mass) of 3.2 g.

Embodiment 10

A similar experiment as conducted in Embodiment 4 was conducted except that the $NaBH_4$ with a particle size of 1.0~1.5 mm was used.

In a temperature increasing phase before the peristaltic pump was activated, a volume of 120 cc of hydrogen was generated. After activating the pump, hydrogen was produced at an initial rate of about 400 cc/hour, and the rate decreased slowly with the proceeding of the reaction. After the reaction had run for 5 hours, the pump was shut down for 8 hours, and during this period, 20 cc of hydrogen was further generated. Afterward, the reaction was restarted and stopped 7.5 hours later (i.e., the total reaction period was 12.5 hours), when the hydrogen production rate dropped to about 150 cc/hour.

The reaction produced a total of 3700 cc of hydrogen at an adequacy of 82.6% relative to a theoretical production of 4480 cc.

The residual product of the reaction had a gross mass (also its net mass) of 3.1 g.

Comparative Example 1

1.9 G (about 0.05 Mol) of $NaBH_4$ with a bulk volume of about 4 cc was filled in the reactor.

The temperature of the glycerol was controlled in the range of 130±5° C., and the flow rate of the peristaltic pump was set to 0.01 g/min.

In a temperature increasing phase before the peristaltic pump was activated, a volume of 40 cc of hydrogen was generated. After activating the pump, hydrogen was produced at an initial rate of about 200 cc/hour, and the rate slowly increased to about 400 cc/hour thereafter. However, the $NaBH_4$ was fluidized and flowed out of the reactor in liquid drops 7 hours later, and the experiment was stopped.

A comparison to those Embodiments described above in which the temperature was controlled to 130±5° C. demonstrated that if the composition of the present invention was not used, the reaction would possibly stop halfway even when it was carried out in the same conditions.

Comparative Example 2

A composition with a bulk volume of 4 cc was prepared by mixing together 1.9 g (about 0.05 Mol) of $NaBH_4$ with a bulk volume of about 4 cc and 0.02 g of $Mg(OH)_2$ with a bulk volume of about 0.05 cc, and was filled in the reactor.

The temperature of the glycerol was controlled in the range of 130±5° C., and the flow rate of the peristaltic pump was set to 0.01 g/min.

In a temperature increasing phase before the peristaltic pump was activated, a volume of 130 cc of hydrogen was generated. After activating the pump, the rate of hydrogen production gradually increased to about 400 cc/hour and then slowly decreased. After the reaction had run for 5 hours, the pump was shut down for 8 hours, and during this period, 80 cc of hydrogen was further generated. Afterward, the reaction was restarted and stopped 7 hours later (i.e., the total reaction period was 12 hours), when the hydrogen production rate dropped to about 150 cc/hour.

The reaction produced a total of 3260 cc of hydrogen at an adequacy of 72.8% relative to a theoretical production of 4480 cc.

After the reaction, significant distortion and shrinkage, as well as slight "drooling and dropping", were observable in the solid stuff in the reactor.

A comparison to those Embodiments described above in which the temperature was controlled to 130±5° C. demonstrated that even when the reaction was carried out in the same conditions, an inappropriately low content of the filler in the composition of the invention would lead to an undesirable adequacy of the reaction and "drooling and dropping" of the solid stuff, which might cause clogging in fluid passage in the apparatus.

Comparative Example 3

1.9 G (about 0.05 Mol) of $NaBH_4$ with a bulk volume of about 4 cc was filled in the reactor.

The temperature of the glycerol was controlled in the range of 140±5° C., and the flow rate of the peristaltic pump was set to 0.03 g/min.

In a temperature increasing phase before the peristaltic pump was activated, a volume of 120 cc of hydrogen was generated. After activating the pump, hydrogen was produced at an initial rate of about 400 cc/hour, and the rate started to slowly decreased 4 hours later. After the reaction had run for 5 hours, the pump was shut down for 8 hours, and during this period, 10 cc of hydrogen was further generated. Afterward, the reaction was restarted and stopped 6 hours later (i.e., the total reaction period was 11 hours), when the hydrogen production rate dropped to about 150 cc/hour.

The reaction produced a total of 3300 cc of hydrogen at an adequacy of 73.7% relative to a theoretical production of 4480 cc.

The residual product of the reaction had a net mass of 2.95 g.

A comparison to those Embodiments described above in which the temperature was controlled to 140±5° C. demonstrated that if the composition of the present invention was not used, an undesirable low adequacy would be resulted even when the reaction was carried out in the same conditions.

It is intended to include all simple modifications known to those skilled in the art in the scope of the invention.

What is claimed is:

1. A sodium borohydride-containing composition for generation of hydrogen, comprising sodium borohydride and a filler, wherein the filler is a substance having a chemical stability and a water solubility of less than 10 g per 100 g of water under an alkaline or neutral condition at a temperature of 130° C. to 140° C., where the chemical stability is an absence of decomposition of the substance and an absence of a chemical reaction with the sodium borohydride or water, and wherein the filler has a bulk volume of 0.02 to 16 times a bulk volume of the sodium borohydride, a mass ratio between the filler and the sodium borohydride being no greater than 2:1, the filler having a bulk density of less than 16 g/cm$^3$, the filler having a mean particle size smaller than a mean particle size of the sodium borohydride, and wherein the alkaline condition is an alkalinity resulting from moisture-caused hydrolysis of the sodium borohydride or a reaction product $NaBO_2$ thereof, and wherein the chemical reaction does not include simple hydration and the decomposition does not include simple dehydration.

2. The sodium borohydride-containing composition according to claim 1, wherein the mass ratio of the filler to the sodium borohydride is no greater than 0.5:1.

3. The sodium borohydride-containing composition according to claim 1, wherein the filler is a substance having a bulk density of less than 0.5 g/cm$^3$.

4. The sodium borohydride-containing composition according to claim 3, wherein the filler is a substance having a bulk density of less than 0.1 or the filler is magnesium hydroxide.

5. The sodium borohydride-containing composition according to claim 3, wherein the filler is a foamed plastic pellet.

6. The sodium borohydride-containing composition according to claim 1, wherein the sodium borohydride has a mean particle size of no less than 0.1 mm and no greater than 2 mm.

7. The sodium borohydride-containing composition according to claim 6, wherein the sodium borohydride has a mean particle size of no less than 0.2 mm and no greater than 1 mm.

8. The sodium borohydride-containing composition according to claim 1, wherein the bulk volume of the filler is 0.2 to 8 times the bulk volume of the sodium borohydride.

9. The sodium borohydride-containing composition according to claim 8, wherein the bulk volume of the filler is 2 to 4 times the bulk volume of the sodium borohydride.

10. A method for generation of hydrogen, comprising the step of subjecting the sodium borohydride-containing composition according to claim 1, to a temperature in a range of 110 to 160° C. and bringing the sodium borohydride-containing composition in contact with water vapor.

11. The method according to claim 10, wherein the temperature is in a range of 120 to 150° C.

12. The method according to claim 10, wherein the temperature is in a range of 110 to 160° C. and gradually declines.

13. A reactor for generation of hydrogen, wherein the reactor is filled with the sodium borohydride-containing composition according to claim 1 and provided with a fluid inlet and a fluid outlet.

14. An apparatus for generation of hydrogen, comprising the reactor according to claim 13, a liquid container and a heater, wherein the liquid container and the reactor are directly or indirectly connected together in a fixed or detachable manner.

15. The apparatus according to claim 14, wherein the liquid container contains water.

16. The sodium borohydride-containing composition according to claim 1, wherein the mean particle size of the filler is smaller than 0.5 times the mean particle size of the sodium borohydride.

17. The apparatus according to claim 14, wherein the liquid container is tubular.

18. The apparatus according to claim 14, wherein the heater is arranged in proximity to the reactor or disposed in the reactor.

* * * * *